(12) United States Patent
Pan et al.

(10) Patent No.: US 7,657,836 B2
(45) Date of Patent: Feb. 2, 2010

(54) SUMMARIZATION OF SOCCER VIDEO CONTENT

(75) Inventors: Hao Pan, Vancouver, WA (US); Baoxin Li, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 574 days.

(21) Appl. No.: 10/260,110

(22) Filed: Sep. 27, 2002

(65) Prior Publication Data

US 2004/0017389 A1    Jan. 29, 2004

Related U.S. Application Data

(60) Provisional application No. 60/398,971, filed on Jul. 25, 2002.

(51) Int. Cl.
*G06F 3/00* (2006.01)
(52) U.S. Cl. .................. 715/723; 715/726; 715/719
(58) Field of Classification Search .............. 715/722, 715/724, 716
See application file for complete search history.

(56) References Cited

U.S. PATENT DOCUMENTS

| | | | |
|---|---|---|---|
| 4,183,056 A | 1/1980 | Evans et al. |
| 4,253,108 A | 2/1981 | Engel |
| 4,298,884 A | 11/1981 | Reneau |
| 4,321,635 A | 3/1982 | Tsuyuguchi |
| 4,520,404 A | 5/1985 | Von Kohorn |
| 4,729,044 A | 3/1988 | Kiesel |
| 4,937,685 A | 6/1990 | Barker et al. |
| 5,027,400 A | 6/1991 | Baji et al. |
| 5,101,364 A | 3/1992 | Davenport et al. |
| 5,109,482 A | 4/1992 | Bohrman |
| 5,148,154 A | 9/1992 | MacKay et al. |
| 5,200,825 A | 4/1993 | Perine |
| D348,251 S | 6/1994 | Hendricks |
| 5,333,091 A | 7/1994 | Iggulden et al. |
| 5,339,393 A | 8/1994 | Duffy et al. |
| D354,059 S | 1/1995 | Hendricks |
| 5,424,770 A | 6/1995 | Schmelzer et al. |
| 5,434,678 A | 7/1995 | Abecassis |
| 5,452,016 A | 9/1995 | Ohara et al. |
| D368,263 S | 3/1996 | Hendricks |
| 5,521,841 A | 5/1996 | Arman et al. |
| 5,559,549 A | 9/1996 | Hendricks et al. |
| 5,589,945 A | 12/1996 | Abecassis |
| 5,600,364 A | 2/1997 | Hendricks et al. |
| 5,600,573 A | 2/1997 | Hendricks et al. |
| 5,610,653 A | 3/1997 | Abecassis |
| 5,634,849 A | 6/1997 | Abecassis |
| 5,635,982 A | 6/1997 | Zhang et al. |
| D381,991 S | 8/1997 | Hendricks |
| 5,654,769 A | 8/1997 | Ohara et al. |
| 5,659,350 A | 8/1997 | Hendricks et al. |
| 5,664,046 A | 9/1997 | Abecassis |

(Continued)

OTHER PUBLICATIONS

Pan et al , Detection of Slow-motion Replay Segments in Sports Video for Highlights Generation, May 2001, IEEE, pp. 1-4.*

(Continued)

*Primary Examiner*—Ryan F Pitaro
(74) *Attorney, Agent, or Firm*—Chernoff, Vilhauer, McClung & Stenzel (57) ABSTRACT

Summarization of video content including soccer.

30 Claims, 8 Drawing Sheets

U.S. PATENT DOCUMENTS

| | | |
|---|---|---|
| 5,664,227 A | 9/1997 | Muedin et al. |
| 5,675,752 A | 10/1997 | Scott et al. |
| 5,682,195 A | 10/1997 | Hendricks et al. |
| 5,684,918 A | 11/1997 | Abecassis |
| 5,696,869 A | 12/1997 | Abecassis |
| 5,710,884 A | 1/1998 | Dedrick |
| 5,717,814 A | 2/1998 | Abecassis |
| 5,724,472 A | 3/1998 | Abecassis |
| 5,734,853 A | 3/1998 | Hendricks et al. |
| 5,761,881 A | 6/1998 | Wall |
| 5,774,357 A | 6/1998 | Hoffberg et al. |
| 5,778,108 A | 7/1998 | Coleman, Jr. |
| 5,797,001 A | 8/1998 | Augenbraun et al. |
| 5,798,785 A | 8/1998 | Hendricks |
| 5,805,733 A | 9/1998 | Wang et al. |
| 5,821,945 A | 10/1998 | Yeo et al. |
| D402,310 S | 12/1998 | Hendricks |
| 5,861,881 A | 1/1999 | Freeman et al. |
| 5,867,386 A | 2/1999 | Hoffberg et al. |
| 5,875,108 A | 2/1999 | Hoffberg et al. |
| 5,892,536 A | 4/1999 | Logan et al. |
| 5,900,867 A | 5/1999 | Schindler et al. |
| 5,901,246 A | 5/1999 | Hoffberg et al. |
| 5,903,454 A | 5/1999 | Hoffberg et al. |
| 5,913,013 A | 6/1999 | Abecassis |
| 5,920,360 A | 7/1999 | Coleman, Jr. |
| 5,920,477 A | 7/1999 | Hoffberg et al. |
| 5,923,365 A * | 7/1999 | Tamir et al. ................ 348/169 |
| 5,926,624 A | 7/1999 | Katz et al. |
| 5,933,811 A | 8/1999 | Angles et al. |
| 5,956,026 A | 9/1999 | Ratakonda |
| 5,958,006 A | 9/1999 | Eggleston et al. |
| 5,959,681 A | 9/1999 | Cho |
| 5,959,697 A | 9/1999 | Coleman, Jr. |
| 5,969,755 A | 10/1999 | Courtney |
| 5,973,683 A | 10/1999 | Cragun et al. |
| 5,986,690 A | 11/1999 | Hendricks |
| 5,986,692 A | 11/1999 | Logan et al. |
| 5,987,211 A | 11/1999 | Abecassis |
| 5,990,927 A | 11/1999 | Hendricks et al. |
| 5,990,980 A | 11/1999 | Golin |
| 5,995,095 A | 11/1999 | Ratakonda |
| 6,002,833 A | 12/1999 | Abecassis |
| 6,011,895 A | 1/2000 | Abecassis |
| 6,014,183 A | 1/2000 | Hoang |
| 6,038,367 A | 3/2000 | Abecassis |
| 6,052,554 A | 4/2000 | Hendricks et al. |
| 6,055,018 A | 4/2000 | Swan |
| 6,067,401 A | 5/2000 | Abecassis |
| 6,072,934 A | 6/2000 | Abecassis |
| 6,081,750 A | 6/2000 | Hoffberg et al. |
| 6,088,455 A | 7/2000 | Logan et al. |
| 6,091,886 A | 7/2000 | Abecassis |
| RE36,801 E | 8/2000 | Logan et al. |
| 6,100,941 A | 8/2000 | Dimitrova et al. |
| 6,141,041 A | 10/2000 | Carlbom et al. |
| 6,141,060 A | 10/2000 | Honey et al. |
| 6,144,375 A | 11/2000 | Jain et al. |
| 6,151,444 A | 11/2000 | Abecassis |
| D435,561 S | 12/2000 | Pettigrew et al. |
| 6,160,989 A | 12/2000 | Hendricks et al. |
| 6,161,142 A | 12/2000 | Wolfe et al. |
| 6,169,542 B1 | 1/2001 | Hooks et al. |
| 6,181,335 B1 | 1/2001 | Hendricks et al. |
| 6,195,497 B1 | 2/2001 | Nagasaka et al. |
| 6,201,536 B1 | 3/2001 | Hendricks et al. |
| 6,208,805 B1 | 3/2001 | Abecassis |
| 6,215,526 B1 | 4/2001 | Barton et al. |
| 6,216,129 B1 | 4/2001 | Eldering |
| 6,219,837 B1 | 4/2001 | Yeo et al. |
| 6,230,501 B1 | 5/2001 | Bailey, Sr. et al. |
| 6,233,389 B1 | 5/2001 | Barton et al. |
| 6,236,395 B1 | 5/2001 | Sezan et al. |
| 6,252,544 B1 | 6/2001 | Hoffberg |
| 6,269,216 B1 | 7/2001 | Abecassis |
| 6,275,268 B1 | 8/2001 | Ellis et al. |
| 6,289,165 B1 | 9/2001 | Abecassis |
| 6,304,665 B1 | 10/2001 | Cavallaro et al. |
| 6,304,715 B1 | 10/2001 | Abecassis |
| 6,342,904 B1 | 1/2002 | Vasudevan et al. |
| 6,363,160 B1 | 3/2002 | Bradski et al. |
| 6,418,168 B1 | 7/2002 | Narita |
| 6,549,643 B1 | 4/2003 | Toklu et al. |
| 6,556,767 B2 | 4/2003 | Okayama et al. |
| 6,597,859 B1 | 7/2003 | Leinhart et al. |
| 6,665,423 B1 | 12/2003 | Mehrotra et al. |
| 6,678,635 B2 | 1/2004 | Torinkere et al. |
| 6,691,126 B1 | 2/2004 | Syeda-Manmood |
| 6,724,933 B1 | 4/2004 | Lin et al. |
| 6,774,917 B1 | 8/2004 | Foote et al. |
| 6,813,313 B2 * | 11/2004 | Xu et al. ................ 375/240.08 |
| 6,829,781 B1 | 12/2004 | Bhagavath et al. |
| 6,856,757 B2 * | 2/2005 | Dagtas ........................ 386/68 |
| 6,931,595 B2 | 8/2005 | Pan et al. |
| 6,970,510 B1 | 11/2005 | Wee et al. |
| 6,981,129 B1 | 12/2005 | Boggs et al. |
| 6,993,245 B1 | 1/2006 | Harville |
| 7,193,645 B1 * | 3/2007 | Aagaard et al. .......... 348/211.3 |
| 2002/0013943 A1 | 1/2002 | Haberman et al. |
| 2002/0018594 A1 * | 2/2002 | Xu et al. ..................... 382/190 |
| 2002/0080162 A1 * | 6/2002 | Pan et al. ..................... 345/723 |
| 2002/0083473 A1 | 6/2002 | Agnihotri et al. |
| 2002/0120929 A1 | 8/2002 | Schwalb et al. |
| 2002/0136528 A1 * | 9/2002 | Dagtas ........................ 386/46 |
| 2002/0141619 A1 | 10/2002 | Standridge et al. |
| 2002/0184220 A1 * | 12/2002 | Teraguchi et al. ............. 707/10 |
| 2002/0194589 A1 | 12/2002 | Cristofalo et al. |
| 2003/0001880 A1 | 1/2003 | Holtz et al. |
| 2003/0026592 A1 | 2/2003 | Kawhara et al. |
| 2003/0081937 A1 | 5/2003 | Li |
| 2004/0017389 A1 | 1/2004 | Pan et al. |
| 2004/0088289 A1 | 5/2004 | Xu et al. |
| 2004/0125124 A1 | 7/2004 | Kim et al. |
| 2004/0125877 A1 | 7/2004 | Chang et al. |
| 2004/0227768 A1 | 11/2004 | Bates et al. |

OTHER PUBLICATIONS

Yow, et. al., *Analysis and Presentation of Soccer Highlights From Digital Video*, Second Asian Conference on Computer Vision 1995, consisting of five pages.

Gong, Y., et. al., *Automatic Parsing of TV Soccer Programs*, IEEE Conference on Multimedia Systems and Computing, pp. 167-174, 1995.

Choi, Y, et al., *Where are the Ball Players?: Soccer Game Analysis With Color-Based Tracking and Image Mosaick*, International Conference on Image Analysis and Pro, Florence, Italy, p. 196-203, Sep.

Babaguchi, et. al., *Linking Live and Replay Scenes in Broadcasted Sports Video*, Proceedings of ACM Multimedia 200 Workshop on Multimedia Information Retrieval (MIR2000), pp. 205-208, Nov. 2000.

Xu, Peng and Chang, Shih-Fu, *Algorithms and System for High-Level Structure Analysis and Event Detection in Soccer Video*, ADVENT-Technical Report No. 111, Columbia University, Jun. 2001.

Kawai, Y., et. al., *Detection of Replay Scenes in Broadcasted Sports Video by Focusing on Digital Video Effects*, IEICE (D-II), vol. J84-D-II, No. 2, pp. 432-435, Feb. 2001 (in Japanese).

Xie, L., *Segmentation and Event Detection in Soccer Audio*, EE 6820 P4oject, May 15, 2001, pp. 1-9.

Pan, H., et. al., *Automatic Detectin of Replay Segments in Broadcast Sports Programs by Detectin of Logos in Scene Transitions*, ICASSP 2002, consisting of four pages.

Xie, L., and Chang, S-F., *Structure Analysis of Soccer Video with Hidden Markov Models*, ICASSP 202, consisting of four pages.

Leonardi, R., et. al., *Semantic Indexing of Multimedia Documents*, IEE Multimedia, pp. 44-51, Apr.-Jun. 2002.

Pan, H., et. al., *Detection of Slow-Motion Replay Segments In Sports Video for Highlights Generation*, IEEE International Conference on Acoustics, Speech and Signal Processing, Salt Lake City, UT 2001, consisting of four pages.

Drew D. Saur, Yap-Peng Tan, Sanjeev R. Kulkarni, and Peter J. Ramadge, "Automated Analysis and Annotation of Basketball Video," SPIE vol. 3022, pp. 176-187.

Selim Aksoy and Robert M. Haralick, "Textural Features for Image Database Retrieval," Intelligent Systems Laboratory, Department of Electrical Engineering, University of Washington, Seattle.

Giridharan Iyengar and Andrew Lippman, "Models for automatic classification of video sequences," SPIE vol. 3312, pp. 216-227.

Hongjiang Zhang, Stephen W. Smoliar and Jian Hua Wu, "Content-Based Video Browsing Tools," SPIE vol. 2417, pp. 389-398.

Bilge Gunsel, Yue Fu and A. Murat Tekalp, "Hierarchical Temporal Video Segmentation and Content Characterization," SPIE vol. 3229, pp. 46-56.

Vikrant Kobla, Daniel DeMenthon, and David Doermann, "Identifying Sports Videos Using Replay, Text, and Camera Motion Features," University of Maryland, Laboratory for Language and Media Processing; at least one year prior to filing date; 12 pages.

Richard W. Conners and Charles A. Harlow, "A Theoretical Comparison of Texture Algorithms," IEEE Transactions on Pattern Analysis and Machine Intelligence, vol. PAMI-2, No. 3, May 1980, pp. 204-222.

S. E. Levinson, L. R. Rabiner, and M. M. Sondhi, "An Introduction to the Application of the Theory of Probabilistic Functions of a Markov Process to Automatic Speech Recognition," American Telephone and Telegraph Company, The Bell System Technical Journal, vol. 62, No. 4, Apr. 1983, pp. 1035-1074.

John Canny, "A Computational approach to Edge Detection," IEEE Transactions on Pattern Analysis and Machine Intelligence, vol. PAMI-8, No. 6, Nov. 1986, pp. 679-698.

Lawrence R. Rabiner, "A Tutorial on Hidden Markov Models and Selected Applications in Speech Recognition," Proceedings of the IEEE, vol. 77, No. 2, Feb. 1989, pp. 257-286.

B. B. Chaudhuri, N. Sarkar, and P. Kundu, "Improved Fractal Geometry Based Texture Segmentation Technique," IEEE Proceedings-E, vol. 140, No. 5, Sep. 1993, pp. 233-241.

Alberto Del Bimbo, Enrico Vicario and Daniele Zingoni, "A Spatial Logic for Symbolic Description of Image Contents," Journal of Visual Languages and Computing (1994) 5, pp. 267-286.

Zhang Stephen W. Smoliar and Hongjiang, "Content-Based Video Indexing and Retrieval," IEEE 1994, pp. 62-72.

F. Arman, R. Depommier, A. Hsu, and M-Y. Chiu, "Content-based Browsing of Video Sequences," Proceedings of ACM International Conference on Multimedia '94, Oct. 15-20, San Francisco, CA, USA.

Stephen S. Intille and Aaron F. Bobick, "Visual Tracking Using Closed-Worlds," M.I.T. Media Laboratory Perceptual computing Section Technical Report No. 294, Nov. 1994, pp. 1-18.

Stephen S. Intille, "Tracking Using a Local Closed-World Assumption: Tracking in the Football Domain," M.I.T. Media Lab Perceptual Computing Group Technical Report No. 296, pp. 1-62, Submitted to the Program in Media Arts and Sciences, School of Architecture and Planning on Aug. 5, 1994.

Boon-Lock Yeo and Bede Liu, "On The Extraction Of DC Sequence From MPEG Compressed Video," IEEE 1995, pp. 260-263.

Michael A. Smith and Takeo Kanade, "Video Skimming for Quick Browsing based on Audio and Image Characterization," Jul. 30, 1995, Carnegie Mellon University, School of Computer Science, Pittsburgh, PA.

Nevenka Dimitrova and Forousan Golshani, "Motion Recovery for video Content Classification," ACM Transactions on Information Systems, vol. 13, No. 4, Oct. 1995, pp. 408-139.

R. W. Picard, "A Society of Models for Video and Image Libraries," IBM Systems Journal, vol. 35, Nos. 3&4, 1996, pp. 292-312.

B.S. Manjunath and W.Y. Ma, "Texture Features for Browsing and Retrieval of Image Data," IEEE Transactions on Pattern Analysis and Machine Intelligence, vol. 18, No. 8, Aug. 1996, pp. 837-842.

Shin'ichi Satoh and Takeo Kanade, "Name-It: Association of Face and Name in Video,", School of Computer Science Carnegie Mellon University, Pittsburgh, PA, Dec. 20, 1996, pp. 1-17.

Wayne Wolf, "Hidden Markov Model Parsing of Video Programs," Proceedings of the 1997 IEEE International Conference on Acoustics, Speech, and Signal Processing, 1997, pp. 2609-2611.

Jonathan D. Courtney, "Automatic Video Indexing via Object Motion Analysis," Pattern Recognition, vol. 30, No. 4, pp. 607-625, 1997.

Minerva M. Yeung, "Video Visualization for Compact Presentation and Fast Browsing of Pictorial Content," IEEE Transactions on Circuits and Systems for Video Technology, vol. 7, No. 5, Oct. 1997, pp. 771-785.

Rainer Lienhart, Silvia Pfeiffer, and Wolfgang Effelsberg, "Video Abstracting," Communications of the ACM, vol. 40, No. 12, Dec. 1997, pp. 55-62.

Boon-Lock Yeo and Minerva M. Yeung, "Retrieving and Visualizing Video," Communications of the ACM, Dec. 1997, vol. 40 No. 12, pp. 43-52.

Mark T. Maybury and Andrew E. Merlino, "Multimedia Summaries of Broadcast News," IEEE 1997, pp. 442-449.

Michael T. Chan, You Zhang and Thomas S. Huang, "Real-Time Lip Tracking and Bimodal Continuous Speech Recognition," 1998.

T. Lambrou, P. Kudumakis, R. Speller, M. Sandler, and A. Linney, "Classification of Audio Signals Using Statistical Features on Time and Wavelet Transform Domains," IEEE 1998, pp. 3621-3624.

Padhraic Smyth, "Belief Networks, Hidden Markov Models, and Markov Random Fields: a Unifying View," Information and Computer Science Department, University of California, Irvine, CA, Mar. 20, 1998, pp. 1-11.

Richard J. Qian, M. Ibrahim Sezan, and Kristine E. Matthews, "A Robust Real-Time Face Tracking Algorithm," IEEE 1998, pp. 131-135.

Dulce Ponceleon, Savitha Srinivasan, Arnon Amir, Dragutin Petkovic, and Dan Diklic, "Key to Effective Video Retrieval: Effective Cataloging and Browsing," ACM, Aug. 1998, pp. 99-107.

Daniel DeMenthon, Vikrant Kobla and David Doermann, "Video Summarization by Curve Simplification," ACM 1998, pp. 211-218.

Nuno Vasconcelos and Andrew Lippman, "Bayesian Modeling of Video Editing and Structure: Semantic Features for Video Summarization and Browsing," IEEE 1998, pp. 153-157.

Toshio Kawashima, Kouichi Tateyama, Toshimasa Iijima, and Yoshinao Aoki, "Indexing of Baseball Telecast for Content-based Video Retrieval," IEEE 1998, pp. 871-874.

M. R. Naphade, R.Mehrotra, A. M. Ferman, J. Warnick, T. S. Huang, A. M. Tekalp, "A High-Performance Shot Boundary Detection Algorithm Using Multiple Cues," Proceedings of IEEE International Conference on Image Processing, Chicago, IL, 1998, pp. 884-887.

John S. Boreczky and Lynn D. Wilcox, "A Hidden Markov Model Framework for Video Segmentation Using Audio and Image Features," Proceedings of IEEE International Conference on Acoustics, Speech, and Signal Processing, Seattle, WA, 1998.

Richard Qian, Niels Haering, and Ibrahim Sezan, "A Computational Approach to Semantic Event Detection," IEEE 1999, pp. 200-206.

Zhu Liu and Quian Huang, "Detecting News Reporting Using Audio/Visual Information," IEEE 1999, pp. 324-328.

Vikrant Kobla, Daniel DeMenthon, and David Doermann, "Detection of Slow-Motion Replay Sequences for Identifying Sports Videos," IEEE Conference, 1999, pp. 135-140.

Rainer Lienhart, "Comparison of Automatic Shot Boundary Detection Algorithms," Part of the IS&T/SPIE Conference on Storage and Retrieval for Image and Video Databases VII, San Jose, California, Jan. 1999, SPIE vol. 3656.

H.B. Lu, Y.J. Zhang, Y.R. Yao, "Robust Gradual Scene Change Detection," Proceedings of IEEE International Conference on Image Processing, Kobe, Japan, 1999.

Stuart J. Golin, "New Metric to Detect Wipes and Other Gradual Transitions in . . . ," Part of the IS&T/SPIE Conference on Visual Communications and Image Processing '99, San Jose, California, Jan. 1999, SPIE vol. 3653, pp. 1464-1474.

Stefan Eickeler and Stefan Muller, "Content-Based Video Indexing of TV Broadcast News Using Hidden Markov Models," Proceedings of IEEE International Conference on Acoustics, speech, and Signal Processing, Phoenix, AZ 1999.

Noboru Babaguchi, "Towards Abstracting sports Video by Highlights," IEEE 2000, pp. 1519-1522.

Ullas Gargi, Rangachar Kasturi, and Susan H. Strayer, "Performance Characterization of Video-Shot-Change Detection Methods," IEEE Transactions on Circuits and Systems for Video Technology, vol. 10, No. 1, Feb. 2000, pp. 1-13.

Yao Wang, Zhu Liu, and Jin-Cheng Huang, "Multimedia Content Analysis," IEEE Signal Processing Magazine, Nov. 2000, pp. 12-35.

Yong Rui, Anoop Gupta, and Alex Acero, "Automatically Extracting Highlights for TV Baseball Programs," ACM Multimedia 2000, Los Angeles, CA, USA, pp. 105-115.

Chung-Lin Huang and Chih-Yu Chang, "Video Summarization using Hidden Markov Model," IEEE 2001, pp. 473-478.

Frank R. Kschischang, Brendan J. Frey, and Hans-Andrea Loeliger, "Factor Graphs and the Sum-Product Algorithm," IEEE Transactions on Information Theory, vol. 47, No. 2, Feb. 2001, pp. 498-518.

Baoxin Li and M. Ibrahim Sezan, "Event Detection and Summarization in sports Video," to be presented in IEEE Workshop on Content-Based Access of Image and Video Libraries (Joint with CUPR), Kauai, Hawaii, Dec. 2001.

Richard O. Duda and Peter E. Hart, "Use of the Hough Transformation To Detect Lines and Curves in Pictures," Stanford Research Insitute, Menlo Park, California, 1972, Association for Computing Machinery, Inc., pp. 11-15.

www.pvi.com, at least one year prior to filing.

John S. Boreczky and Lynn D. Wilcox, "A Hidden Markov Model Framework for Video Segmentaiton Using Audio and Image Features," FX Palo Alto Laboratory, Palo Alto, CA 94304 USA, at least one year prior to filing.

Lexing Xie, "Segmentation and Event Detection in Soccer Audio," EE 6820 Project Soccer Audio, May 15, 2001, pp. 1-9.

Alan E. Bell, "The dynamic digital disk," IEEE Spectrum. Oct. 1999, pp. 28-35.

International Organization for Standardization, ISO/IEC JTC1/SC29/WG11/N3399, Coding of Moving Pictures and Associated Audio, "Visual Working Draft 3.0," Jun. 2000, Geneva.

International Organisation for Standardisation, ISO/IEC JTC1/SC29/WG11/N3398, Coding of Moving Pictures and Associated Audio Information, "MPEG-7 Visual Part of eXperimentation Model Version 6.0," Jun. 2000, Geneva.

International Organization for Standardization, ISO/IEC JTC 1/SC 29/WG 11/N3410, Coding of Moving Pictures and Audio, MPEG-7 Multimedia Description Schemes XM (Version 3.0), May 2000, Geneva.

International Organization for Standardization ISO/IEC JTC 1/SC 29/WG 11/N3411, Coding of Moving Pictures and Audio, MPEG-7 Multimedia Description Schemes WD (Version 3.0), May 2000, Geneva.

International Organization for Standardization, ISO/IEC JTC1/SC29/WG11/N3391, Coding of Moving Pictures and Associated Audio, "DDL Working Draft 3.0," May 2000., Geneva.

International Organisation for Standardisation, ISO/IEC JTC1/SC29/WG11/N2844, Coding of Moving Pictures and Audio Information, "MPEG-7 Description Schemes (V0.5)," Jul. 1999, Vancouver.

International Organisation for Standardisation, ISO/IEC JTC1/SC29/WG11/MXXXX, MPEG-7 Media/Meta DSs upgrade (V02.), Oct. 1999, Melbourne.

ISO/IEC JTC 1/SC 29 N3705, "Information Technology—Multimedia Content Description Interface—Part 5: Multimedia Description Schemes," Nov. 17, 2000.

International Organization for Standardization, ISO/IEC JTC 1/SC 29/WG 11/N3966, Information technology—Multimedia Content Description Interface—part 5: Multimedia Description Schemes, Mar. 12, 2001.

"XML Schema Part 1: Structures," W3C Working Draft, May 6, 1999, pp. 1-60.

"XML Schema Part 2: Datatypes," World Wide Web Consortium Working Draft, May 6, 1999, pp. 1-37.

"A Schema for TV-anytime: Segmentation Metadata AN195," NDS Contribution from MyTV, Copyright NDS Limited 2000, pp. 1-27.

"A Schema for TV-Anytime Segmentation Metadata AN195r1," myTV project, Copyright NDS Limited 2000, pp. 1-28.

Christel, Micheal G., Hauptmann, Alexander G., Warmack, Adrienne S., and Crosby, Scott S., "Adjustable Filmstrips and Skims as Abstractions for a Digital video Library," Computer Science Department, Carnegie Mellon University, Pittsburgh, PA; pp. 1-7.

Masumitse, Ken and Echigo, Tomio, Video summarization Using Reinforcement Learning in Eigenspace; IBM Research, Tokyo Research Laboratory 1623-14, Shimotsuruma, Yamatoshi, Kanagawa, Japan.

* cited by examiner

SUMMARIZATION OF SOCCER VIDEO CONTENT

This application claims the benefit of U.S. Patent Ser. No. 60/398,971 filed Jul. 25, 2002.

BACKGROUND OF THE INVENTION

The present invention primarily relates to summarization of video content including soccer The amount of video content is expanding at an ever increasing rate, some of which includes sporting events. Simultaneously, the available time for viewers to consume or otherwise view all of the desirable video content is decreasing. With the increased amount of video content coupled with the decreasing time available to view the video content, it becomes increasingly problematic for viewers to view all of the potentially desirable content in its entirety. Accordingly, viewers are increasingly selective regarding the video content that they select to view. To accommodate viewer demands, techniques have been developed to provide a summarization of the video representative in some manner of the entire video. Video summarization likewise facilitates additional features including browsing, filtering, indexing, retrieval, etc. The typical purpose for creating a video summarization is to obtain a compact representation of the original video for subsequent viewing.

There are two major approaches to video summarization. The first approach for video summarization is key frame detection Key frame detection includes mechanisms that process low level characteristics of the video, such as its color distribution, to determine those particular isolated frames that are most representative of particular portions of the video. For example, a key frame summarization of a video may contain only a few isolated key frames which potentially highlight the most important events in the video. Thus some limited information about the video can be inferred from the selection of key frames. Key frame techniques are especially suitable for indexing video content but are not especially suitable for summarizing sporting content The second approach for video summarization is directed at detecting events that are important for the particular video content. Such techniques normally include a definition and model of anticipated events of particular importance for a particular type of content. The video summarization may consist of many video segments, each of which is a continuous portion in the original video, allowing some detailed information from the video to be viewed by the user in a time effective manner. Such techniques are especially suitable for the efficient consumption of the content of a video by browsing only its summary. Such approaches facilitate what is sometimes referred to as "semantic summaries"

There are several proposed techniques for the summarization of a soccer game based on fully parsing the structure of the whole soccer game For example, Gong et al. propose to classify the frames in a soccer game into various play categories, such as a shot at left goal, top-left corer kick, play in right penalty area, in midfield, etc., based on a model with four components, the soccer field, the ball, the players, and the motion vectors. See, Y. Gong, L. T Sin, C. H. Chuan, H.-J. Zhang, M Sakauchi, "Automatic parsing of TV soccer programs," IEEE conference on Multimedia systems and computing, pp 167-174, 1995.

Yow et al propose to construct a panoramic view of selected events by recognizing the soccer field, tracking of the ball, and recognizing the camera movement. See, D. Yow, B.-L Yeo, M. Yeung, B. Liu, "Analysis and presentation of soccer highlights from digital video," Second Asian conference on computer vision, 1995

Choi et al, propose to construct panoramic view of certain events by recognizing the soccer field by color information, tracking players by template matching and Kalman filtering, and processing occlusion by color histogram back-projection The panoramic view is based on a model for the soccer field and all frames in the video are transformed into the views in the model. See, S. Choi, Y. Seo, H. Kim, K-S Hong, "Where are the ball and players? Soccer game analysis with color-based tracking and image mosaic", International conference on image analysis and Pro, Florence, Italy, pp. 196-203, September, 1997.

Leonardi et al propose to use both audio and visual features of a multimedia document and a Hidden Markov Model (HMM) as a bottom-up semantic framework and a finite-state machine as a top-down semantic framework. Broadcast soccer is one example of their general method. The video features are "lack of motion", "camera operations" and "presence of shot cuts." The audio features are Mel-Cepstrum coefficients and zero crossing rates and are categorized into music, silence, speech, and music See, R. Leonardi, P. Migliorati, "Semantic indexing of multimedia documents," IEEE Multimedia, pp.44-51, April-June, 2002

Xie et al., propose using a Hidden Markov Model (HMM) as the framework to segment a soccer video into "play/break." The features used by Xie et al. are visual dominant-color ratio and motion intensity. See, L. Xie, S.-F. Chang, "Structure analysis of soccer video with hidden Markov models," ICASSP 2002. Xu et al propose a similar framework without using the hidden Markov models. See, P. Xu, S.-F. Chang, "Algorithms and system for high-level structure analysis and event detection in soccer video," ADVENT-Technical report #111, Columbia University, June 2001.

Xie, proposes using a framework that is entirely based on audio features. The approach segments the whole sound track into commentary and crowd noise and then picks up the excited/unusual parts in crowd noise. L. Xie, "Segmentation and event detection in soccer audio," EE 6820 Project, May 2001.

Babaguchi et al. propose a technique to link live and replay scenes in American football broadcast video. The replay scenes are detected by (1) a video caption detection or (2) the sandwiching of digital video effects on either side of the replay segment. Babaguchi et al. note that it is impossible to design a general detector applicable to any DVEs, because there are a considerable number of DVE patterns that appear in everyday broadcasts. The DVE effect taught by Babaguchi et al. is a gradual shot change operation related to spatial aspects. The linking of live and replay scenes is performed based upon the dominant color of the key frame and the ratio of the number of vertical lines to that of horizontal lines on the field, which is representative of the camera angle. This technique for linking using the technique taught by Babaguchi et al., namely using the ratio, is suitable for the intended application, namely, American Football. However, this technique is not applicable to soccer.

What is desired, therefore, is a video summarization technique suitable for video content that includes soccer.

DETAILED DESCRIPTION OF THE PREFERRED EMBODIMENT

Soccer is perhaps the most popular sport in the world. A cumulative total of about 32 billion people watched the 64 games of the 2002 FIFA world cup. A typical soccer game lasts about 90 minutes, plus the half-time break and an occasional extension. Usually, not every moment in the game is eventful or important. After a soccer game is over, most audiences, especially those who have already watched the live game, are more interested in watching the most exciting events again rather than the entire game. Avid fans that missed the game are indeed very interested in all the important events of the game The time during which the ball is kicked into the goal, a red card occurs, a yellow card occurs, a corner kick occurs, a penalty kick occurs, well played one-on-one ball movement, a shot on goal, a "save" by the goalkeeper, a cross (ball crossed relatively close in front of the goal), a nutmeg (player passes the ball between the legs of his opponent and runs around his opponent to get the ball), bicycle kick, a header, a player is tackled to the ground, etc., are normally the exciting part of the game. The remaining time during the soccer match is typically not exciting to watch on video, such as for example, nearly endless commercials, the time during which the players move the ball around the center of the field, the time during which the players pass the ball back and forth, etc. While it may indeed be entertaining to sit in a stadium for hours watching a 90 minutes soccer match, many people who watch a video of a soccer match find it difficult to watch all of the game, even if they are loyal fans. A video summarization of the soccer video, which provides a summary of the match (e.g., game) having a duration shorter than the original soccer video, may be appealing to many people. The video summarization should provide nearly the same level of the excitement (e.g. interest) that the original match provided Upon initial consideration, soccer would not be a suitable candidate to attempt automated video summarization. Initially, there are nearly an endless number of potential plays that may occur which would need to be accounted for in some manner. Also, there are many different types of plays, such as a corner kicks, throw-ins from the sideline, attempted goals, headers, etc., that likewise would need to be accounted for in some manner. In addition, each of these plays involves significant player motion which is difficult to anticipate, difficult to track, and is not consistent between plays. Moreover, the ball would normally be difficult, if not impossible, to track during a play because much of the time it is obscured from view. In addition, much of the play regarding soccer involves the motion of a significant number of players spread across the field, which is difficult to interpret in an automated fashion. Based upon such considerations soccer has been previously considered impractical, if not impossible, to attempt to summarize.

It is conceivably possible to develop highly sophisticated models of a typical soccer video to identify potentially relevant portions of the video, and many attempts have been made as previously described in the background. However, such highly sophisticated models are difficult to create and are not normally robust. Further, the likelihood that a majority of the highly relevant portions of the soccer video will be included in such a video summarization is low because of the selectivity of the model. Thus the resulting video summarization of the soccer video may simply be unsatisfactory to the average viewer.

After consideration of the difficulty of developing highly sophisticated models of a soccer video to analyze the content of the soccer video, as the sole basis upon which to create a soccer summarization, the present inventors determined that this technique is ultimately flawed as the models will likely never be sufficiently robust to detect all the desirable content. Moreover, the number of different types of model sequences of potentially desirable content is difficult to quantify. In contrast to attempting to detect particular model sequences, the present inventors determined that the desirable segments of the soccer match, which are by their nature generally "non-stop" matches, are preferably selected based upon characteristics of the broadcast video. The characteristics of the broadcast video which the present inventors identified as providing an indication of an exciting portion of the soccer match is the "replay". Without the "action-stop" nature of some sporting activities, such as football and baseball, it is difficult to otherwise determine such events. Any method may be used for detecting replays, such as for example, N. Babaguchi, Y. Kawai, Y. Yasugi and T. Kitahashi, "Linking Live and Replay Scenes in Broadcasted Sports Video," *Proceedings of ACM Multimedia* 2000 *Workshop on Multimedia Information Retrieval* (MIR2000), pp.205-208, November 2000; Y. Kawai, N. Babaguchi and T. Kitahashi, "Detection of Replay Scenes in Broadcasted Sports Video by Focusing on Digital Video Effects," *Trans. IEICE*(D-II), Vol.J84-D-II, No.2, pp.432-435, February 2001 (in Japanese); H. Pan, P. van Beek, and M. I. Sezan, "Detection of Slow Motion Replay Segments in Sports Video for Generating Sports Video Highlights," *ICASSP* 2001; and H. Pan, B. Li, and M. I. Sezan, "Automatic Detection of Replay Segments in Broadcast Sports Programs by Detection of Logos in Scene Transitions," *ICASSP* 2002, incorporated by reference herein.

Figure 1:
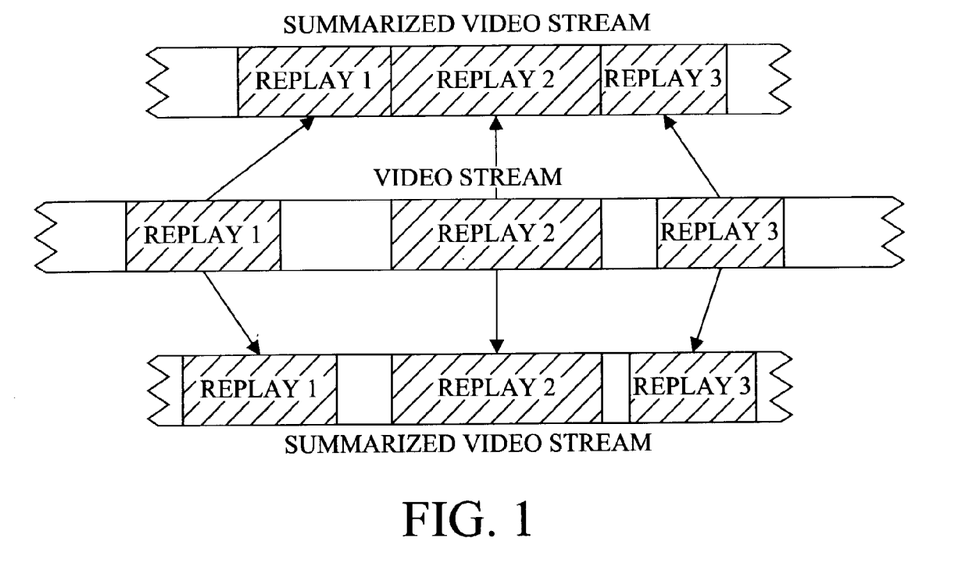
FIG. 1 illustrates a summarized video stream.

Referring to FIG. 1, one technique for the summarization of soccer video is to identify replay segments, such as replay 1, replay 2, and replay 3. Then a modified video stream may be created based upon the detection of the replay 1, replay 2, and replay 3. The modified stream may include the replays without additional material there between, or may include additional video material between the replay segments. In any case, the resulting video stream is of a shorter duration than the original video stream, or otherwise the replay segments are temporally spaced closer together in the modified video stream. Moreover, the modified video stream may be a set of pointers to the original video stream indicating those portions of the original video stream that comprise the summarization, while avoiding the need to actually modify the video stream itself.

Figure 2:
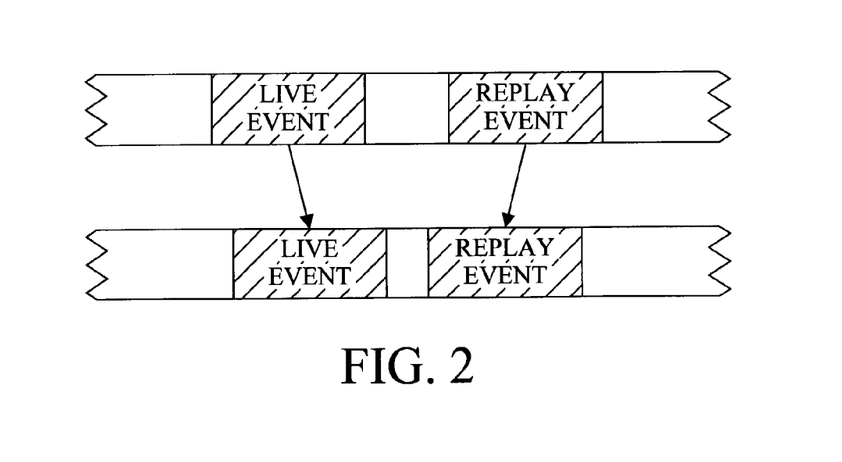
FIG. 2 illustrates live and replay events.

After further consideration of the typical broadcast of soccer matches it was determined that a replay of a potentially exciting action occurs after the presentation of the "live" action. Since in the broadcast of a soccer match the "live" action and the replay of the action are presented with different camera angle and/or field of view, the presentation of both to the viewer would provide added excitement to the event, as shown in FIG. 2 The result is more than the presentation of the same segment twice or two uncorrelated events. In this manner it was determined that the presentation of both the replay event and the live event, both having a different perspective of the same event, would provide additional desirable summarization content for the viewer. The live event is normally temporally previous to the replay of the same event Preferably, the live event and the replay of the event include at least 25%, 50%, or 75% or more of the same event, albeit potentially using different camera angles and different fields of view (e.g., zoomed in or zoomed out).

Figure 3:
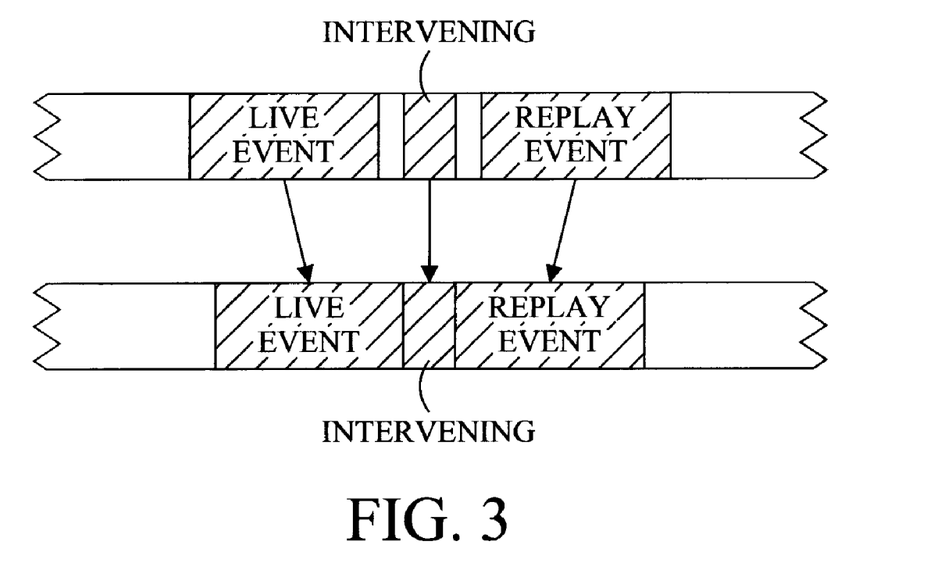
FIG. 3 illustrates live, replay, and intervening segments.

While the presentation of the "live event" and the "replay event" results in content that is far more than merely the presentation of the individual events alone because of the resulting synergy for the user that the combination creates, the present inventors determined that normally a limited amount of time elapses between the "live" and "replay" events, where this region of the video frequently includes "close-up" scenes of players, referees, etc Such information is also likely to be of interest to the user because it frequently includes facial expressions of excitement or disgust. Referring to FIG. 3, in this manner it was determined that the presentation of the replay event, the live event, and the intervening material, would provide additional desirable summarization content for the viewer. Preferably, the intervening video material includes at least 25%, 50%, or 75% or more of the temporal video sequence between the "live" and "replay"

Figure 4:
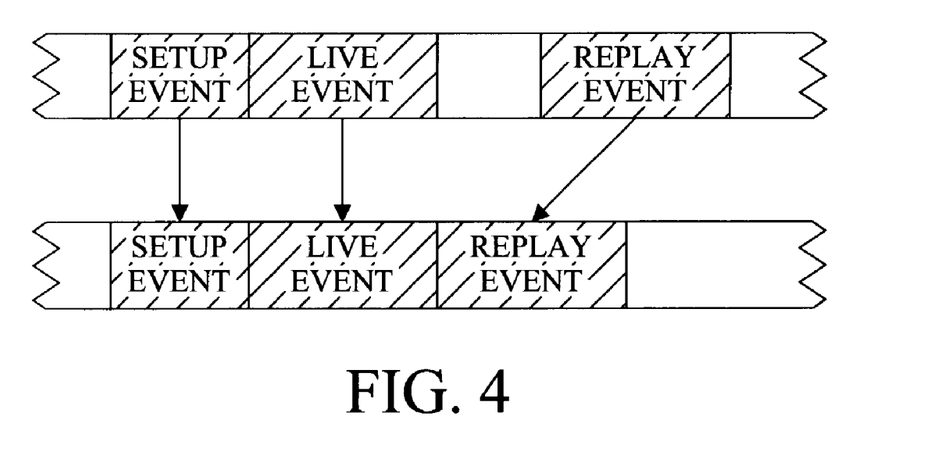
FIG. 4 illustrates setup, live, and replay events.

While the presentation of the "live event" and the "replay event" results in content that is far more than merely the presentation of the individual events alone because of the resulting synergy for the user that the combination creates, the present inventors also determined that normally a limited amount of the "setup" time to the live action is also likely to be of interest to the user because it frequently includes contextual information to the "live event" and "replay event" to make the resulting summarization more interesting. The "setup" material in addition is normally semantically relevant to the "live event" and/or the "replay event". Referring to FIG. 4, in this manner it was determined that the presentation of the setup, the live event, and the replay event, would provide additional desirable summarization content for the viewer. Preferably, the setup video material includes at least 25%, 50%, or 75% or more of the duration of either the corresponding "live" and "replay" material.

Figure 5A:
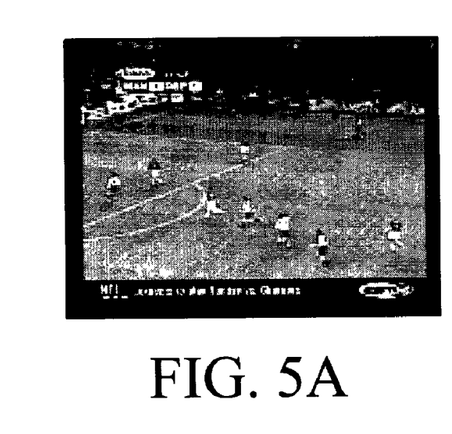
FIG. 5 illustrates a live goal
Figure 5B:
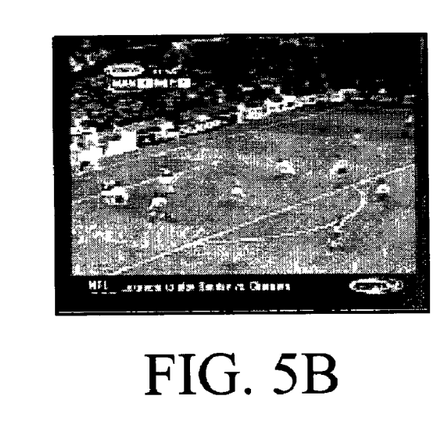
Figure 5C:
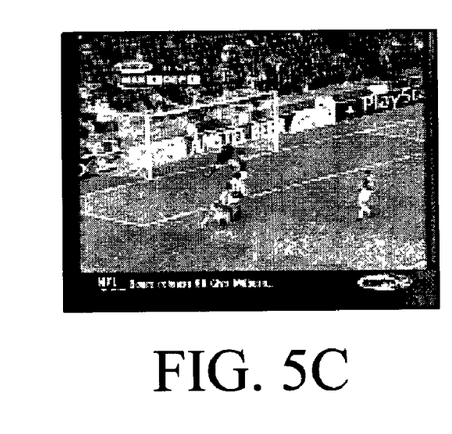
Figure 5D:
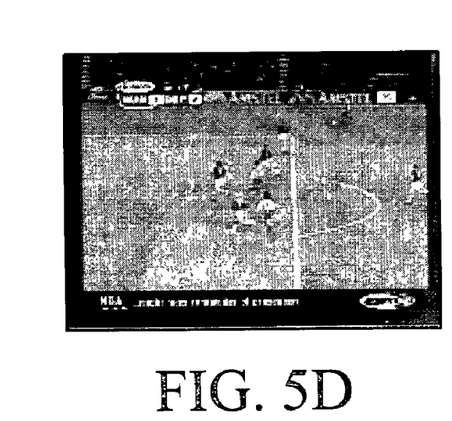
Figure 5E:
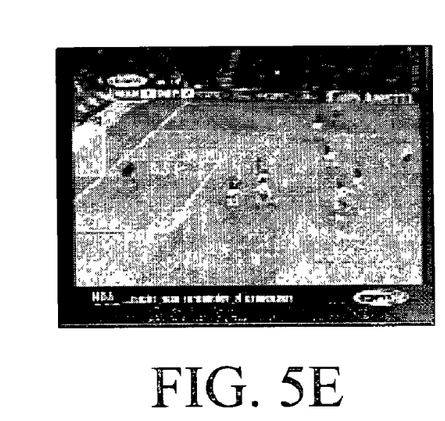
Figure 5F:
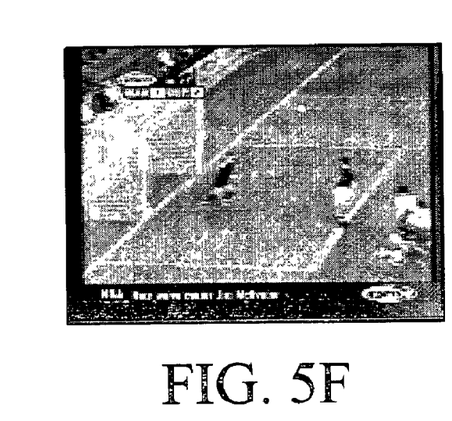

Referring to FIG. 5 by way of illustration, FIGS. 5A-5C illustrate a goal from a "live" broadcast, while FIGS. 5D-5F illustrate the corresponding "replay" broadcast. FIGS. 5A-5C show different camera angles and different zoom-factors than used in the "replay" of FIGS. 5D-5F. While the semantic content of the two versions are the same, the live version usually employs a wide-angle camera shooting from a distance while the replay version usually employs a narrow-angle camera shooting in close range. In other words, the frame in the replay appears structurally different from those in the live version. As previously discussed, it would be at best difficult to use content analysis technology to determine that the contents are the same.

Figure 6:
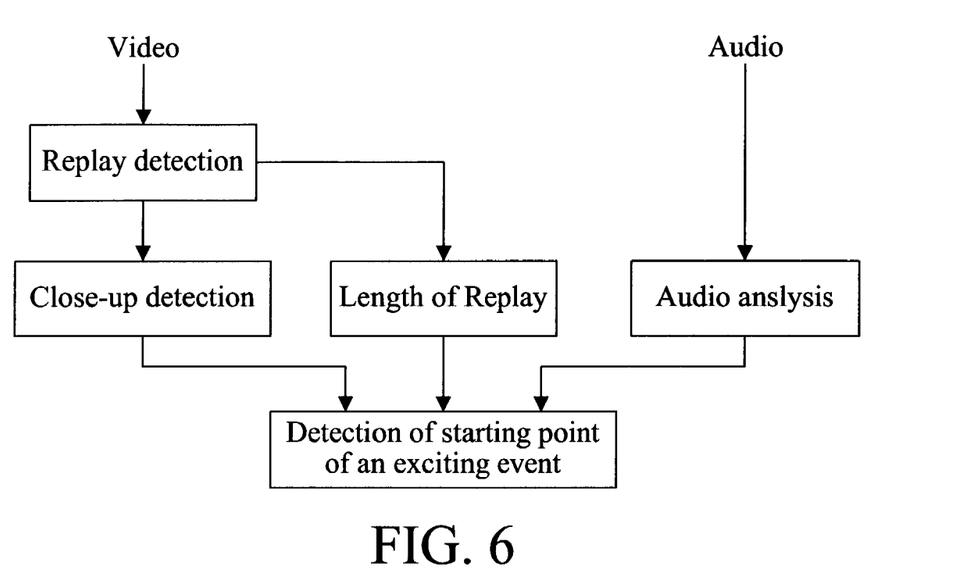
FIG. 6 is a block diagram of a video summarization system.

Referring to FIG. 6, a system suitable for the creation of summarizations of soccer content is shown. The video is initially processed by the replay detection module to identify portions of the video that are replays. Any suitable replay detection technique may be used, as desired. The replay detection module identifies the replay segment and the associated live segment.

Figure 7:
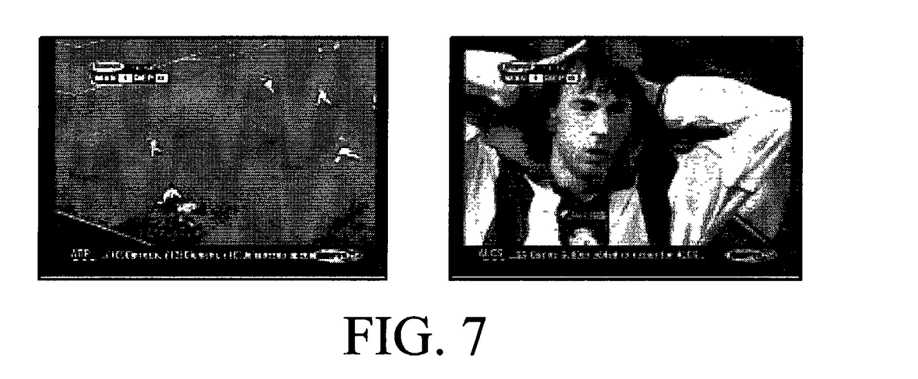
FIG. 7 shows far away and close up views.

To identify close-up segments preceding replays that are subsequent to the corresponding live segment, visual features of the video may be used. The close-up segments are varied in their content, zoom factor, color characteristics, all of which are without any particular invariant characteristics. Therefore it would appear difficult to determine the content as being a close-up. However, the present inventors determined that the close-ups are different from other video, so a determination that it is sufficiently dissimilar is sufficient. Accordingly, the first visual feature relies on detecting the absence the anticipated color of a soccer field, which is typically generally green. One technique to detect the absence of a particular color is to determine the ratio of the number of pixels belonging to the generally green color of a soccer field to the total number of pixels in a frame. In close-up segments, players and referees are shot from a close distance, as illustrated in FIG. 7B. Therefore, the frame is not dominated by the colors of the soccer field. In contrast, the dominant color of a soccer field which comprises a large portion of a frame is generally green, as illustrated in FIG. 7A.

In some cases the dominant color of a soccer field varies from time to time, and game to game. However, soccer fields still tend to be generally green in most cases. One technique to determine the ratio of the number of green pixels to the number of pixels in a frame may be calculated in the normalized red-green-blue color space, with normalized red and green color components being considered. The normalized values may be calculated as:

$$R' = \frac{R}{R+G+B} \quad G' = \frac{G}{R+G+B}$$

Figure 8:
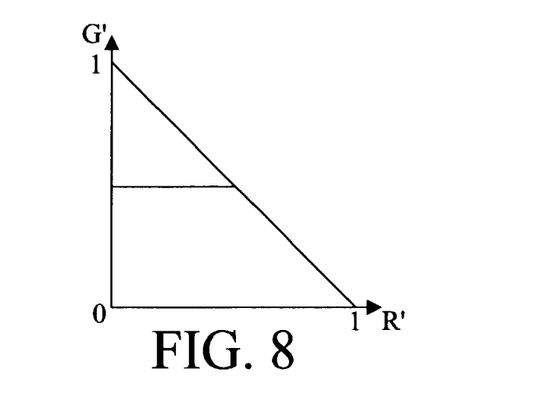
FIG. 8 is a normalized color space.
Figure 9:
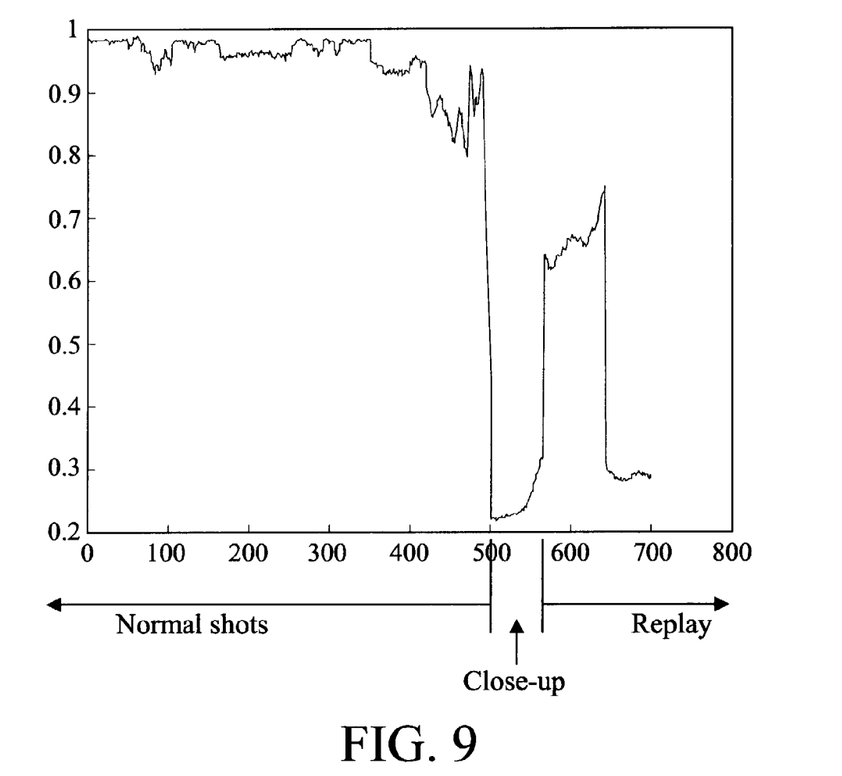
FIG. 9 illustrates pixel ratios.

The normalized color space is illustrated in FIG. 8. One characterization for whether a pixel is generally green may be if its normalized values $R'<0.5$, $G'>0.5$, and $R'+G'\leqq1.0$. The generally green pixels may be counted and compared again the total number of pixels in the entire frame to determine if the scene is sufficiently green. Other characterizations and/or color spaces may likewise be used. Referring to FIG. 9, an example of the ratio of the number of green pixels to the total number of pixels in a frame over a period of time is illustrated. For typical soccer the ratio is close to 1, while in close-up shots the ratio is close to 0; while in replay segments the ratio tends to vary.

Figure 10:
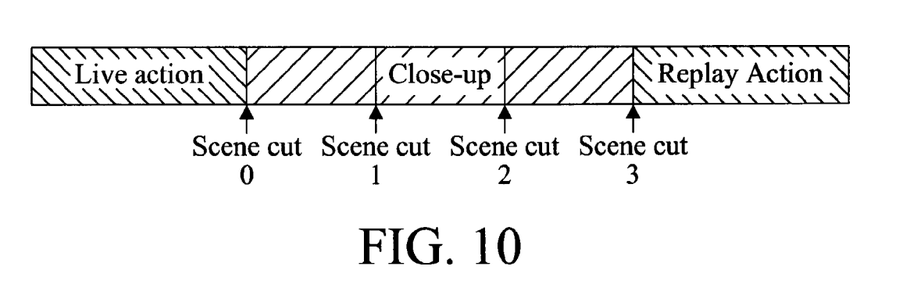
FIG. 10 illustrates scene cuts.

The second visual feature relies on detecting sufficient scene changes during the video. Usually there is a sudden scene cut between the live action and the close-up segment. Periodically, a close-up segment between the live action and its replay consists of several different shots of players, coaches, and audiences, and therefore includes several scene cuts, as illustrated in FIG. 10. The close-up segment shown in FIG. 10 includes three segments and four scene cuts The close-up segment may be characterized by the low ratio of the number of green pixels to the number of the total pixels in a frame. The earliest scene cut in this time period with a low ratio may be selected as the starting point of the close-up segment and the end point of the live action, labeled as scene cut 0 of FIG. 10.

Any suitable scene cut detection technique may be used. In the preferred system the scene cuts are determined as the difference between color histograms of every two adjacent frames. The color histogram is calculated in the normalized red-green-blue color space and each of the normalized red and green color components are evenly divided into 16 bins. As a result, there are a total number of 16×16=256 bins. The difference between two color histograms is measured using a mean-square error criterion. A sufficient change, such as greater than a predetermined threshold, in the color histogram difference identifies a scene cut.

After determining the end points of the live action segments, the system then determines their starting point. Due to the nature of soccer games most of the events do not have objective starting points of exciting events for a user, except for perhaps a corner kick and a free kick. Moreover, in most exciting actions the different events in a soccer game proceed in an unbroken sequence. In many cases, a portion of a game that is continuous may last for several minutes and uses camera pan and zoom, but lacks sharp scene cuts or gradual transitions. Therefore, it is not effective to use scene cut or transition detection techniques to determine the "starting point" of event segments Accordingly, the system may subjectively select the starting points of events associated with the detected replay segments as being a given duration, such as 15 or 30 seconds prior to the starting point of the close-up segments or end point of the live action segments. It is to be understood that the duration of the "live" segment may be selected in any manner, such as in a manner based in some way on the duration of the "replay" segment.

A system may have multiple durations of the corresponding live segments For example, the system may subjectively select the starting point of events associated with the detected replay segments as being either 15 or 30 seconds prior to the starting points of the close-up segments (or end point of live action segments). The criteria for selecting between 15 or 30 seconds may involve defaulting to 15 seconds unless a criteria is satisfied, otherwise 30 seconds is selected.

Figure 11:
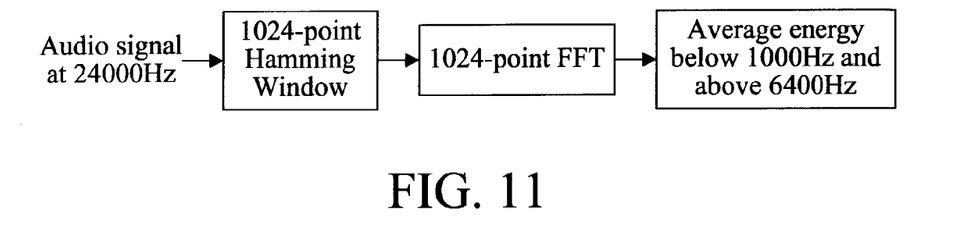
FIG. 11 illustrates audio energy.

The first criteria for seleting 30 seconds may be the energy of the audio signal at frequencies below 1000 hertz and/or above 6400 hertz. Energies of the audio track below 1000 hertz and above 6400 hertz are usually low in unexciting moments and high in exciting moments The energy may be calculated as shown in FIG. 11 It is to be understood that the frequencies may be changed, as desired. If the average audio energy over the 30-second duration is larger than the average energy over the 15-second duration, then a 30-second live event segment is preferred, otherwise a 15-second live event segment is preferred The system may also use the audio pitch contour to reflect the degree of excitement of commentators. For example, a higher pitch may be associated with a higher degree of excitement.

Figure 12:
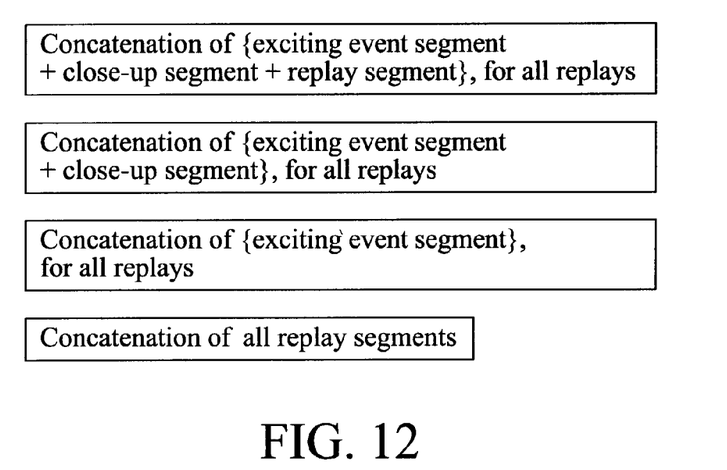
FIG. 12 shows replay based summaries.

Another criteria is the duration of the replay segments. The lengths of the replay segments tend to be correlated with the excitement of the actions in the replays. For example, a replay of a goal which is considered to be quite exciting is much longer than a replay of a foul which is considered only mildly exciting. When an action is more exciting, it is more desirable to provide more "live" event to see how the exciting event occurred One way to make this determination is if the replay exceeds a threshold, then a 30-second long "live" event is selected; otherwise, a 15 second "live" event is selected A summarization presented to the user may be hierarchical in nature, if desired. The desired summary may be selected by the user. Referring to FIG. 12, the summary may be the concatenation of the replay segments. The next summary may be the concatenation of the live segments. The next summary may be the concatenation of the live and replay segments. The next summary may be the concatenation of the live, close-up, and replay segments Also, the techniques taught herein may be applicable to other sporting broadcasts, such as for example, ice hockey.

The summary description defines those portions of the video sequence that contain the relevant segments for the video summarization. The summary description may be compliant with the MPEG-7 Summary Description Scheme or TV-Anytime Segmentation Description Scheme. A compliant media browser may apply the summary description to the input video to provide summarized viewing of the input video without modifying it. Alternatively, the summary description may be used to edit the input video and create a separate video sequence. The summarized video sequence may comprise the selected segments which excludes at least a portion of the original video other than the plurality of segments. Preferably, the summarized video sequence excludes all portions of the original video other than the plurality of segments.

Figure 13:
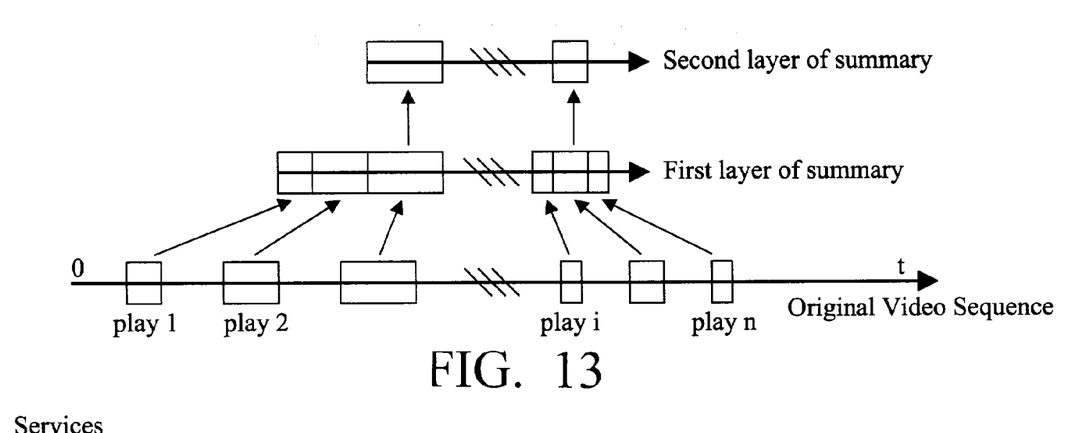
FIG. 13 shows different summary levels.

Referring to FIG. 13, the first layer of the summary is constructed using the detection technique. The second and third layers (and other) are extracted as being of increasingly greater excitement, based at least in part, on the audio levels of the respective audio of the video segments Also, it would be noted that the preferred audio technique only uses the temporal domain, which results in a computationally efficient technique. In addition, the level of the audio may be used as a basis for the modification of the duration of a particular play segment. For example, if a particular play segment has a high audio level then the boundaries of the play segment may be extended. This permits a greater emphasis to be placed on those segments more likely to be exciting. For example, if a particular play segment has a low audio level then the boundaries of the play segment may be contracted. This permits a reduced emphasis to be placed on those segments less likely to be exciting. It is to be understood that the layered summarization may be based upon other factors, as desired.

Figure 14:
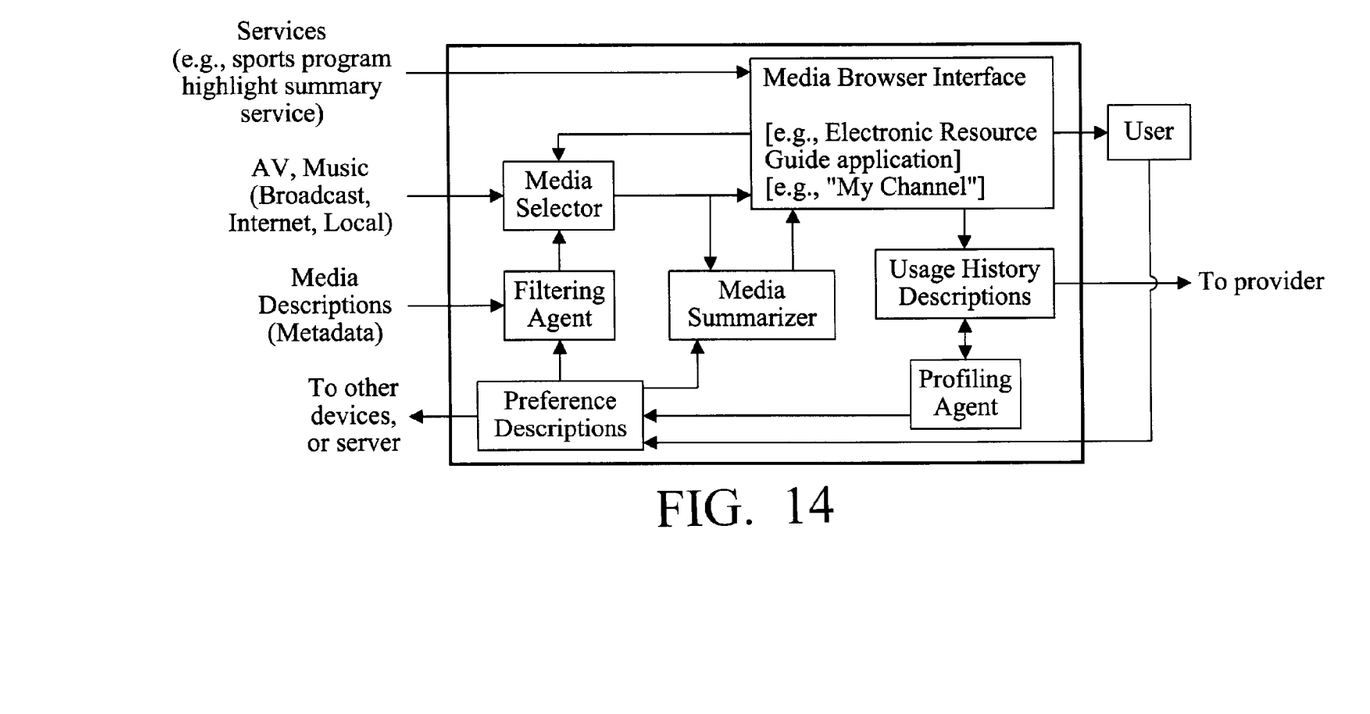
FIG. 14 shows a browser.

Referring to FIG. 14, the video summarization may be included as part of an MPEG-7 based browser/filter, where summarization is included within the standard. With different levels of summarization built on top of the aforementioned video summarization technique, the system can provide the user with varying levels of summaries according to their demands. Once the summary information is described as an MPEG-7 compliant XML document, one can utilize all the offerings of MPEG-7, such as personalization, where different levels of summaries can be offered to the user on the basis of user's preferences described in an MPEG-7 compliant way. Descriptions of user preferences in MPEG-7 include preference elements pertaining to different summary modes and detail levels.

In the case that the summarization is performed at a server or service provider, the user downloads and receives the summary description encoded in MPEG-7 format Alternatively, in an interactive video on demand (VOD) application, the media and its summary description reside at the provider's VOD server and the user (e.g., remote) consumes the summary via a user-side browser interface. In this case, the summary may be enriched further by additional information that may be added by the service provider. Further, summarization may also be performed by the client.

Figure 15:
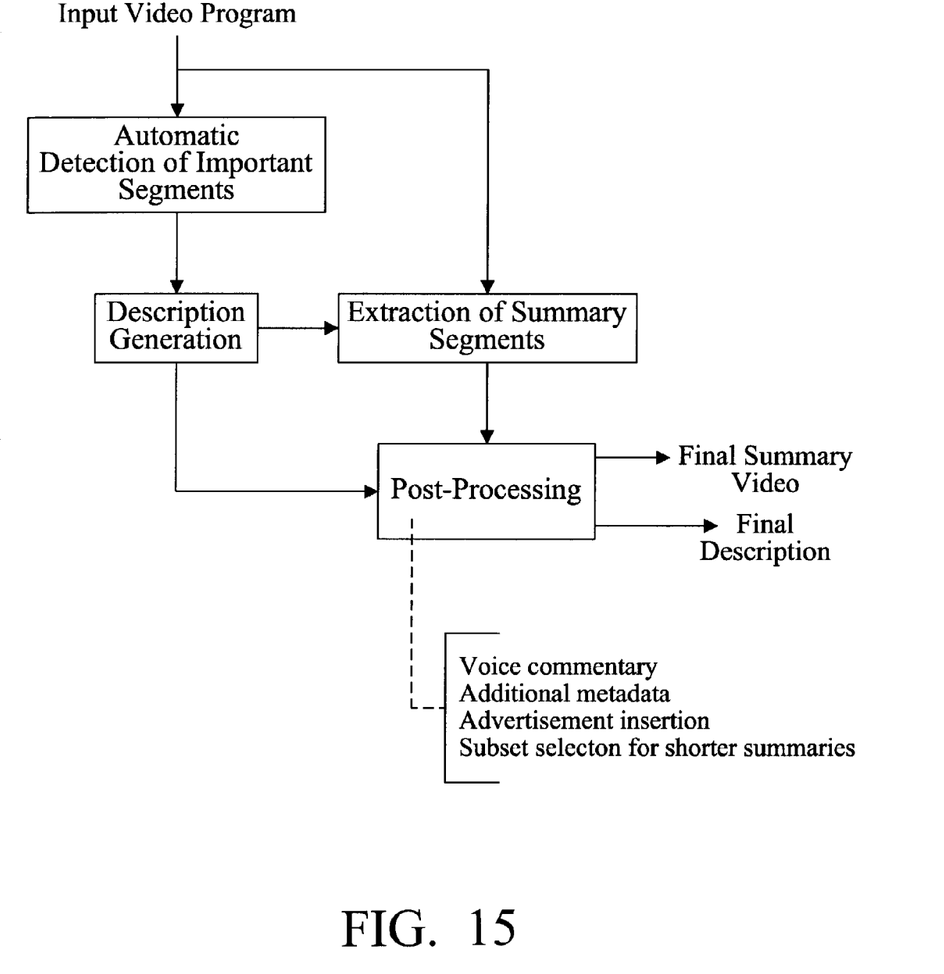
FIG. 15 shows video extraction.

Referring to FIG. 15, the output of the module that automatically detects important segments may be a set of indices of segments containing events (e g., plays) and important parts of the input video program. A description document, such as an MPEG-7 or TV-Anytime compliant description is generated in The Description Generation module. Summary segments are made available to the Post-Processing module by The Extraction of Summary Segments module which processes the input video program according to the description. A post-processing module processes the summary Segments and/or the description to generate the final summary video and final description. The post-processing module puts the post-processed segments together to form the final summary video. The post-processing module may transcode the resulting video to a format different that of the input video to meet the requirements of the storage/transmission channel. The final description may also be encoded, e.g., binarized if it is generated originally in textual format such as XML. Post-processing may include adding to the original audio track a commentary, insertion of advertisement segments, or metadata. In contrast to play detection, post-processing may be completely, or in part, manual processing It may include, for example, automatic ranking and subset selection of events on the basis of automatic detection of features in the audio track associated with video segments. This processing may be performed at the server and then the resulting video transferred to the client, normally over a network Alternatively, the resulting video is included in a VOD library and made available to users on a VOD server.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow. All references cited herein are hereby incorporated by reference.

The invention claimed is:

1. A method of automatically processing a video comprising a series of sequentially ordered frames and including soccer and that includes at least one replay segment corresponding to a live action segment, said replay segment replaying at least a portion of said live action segment from a different camera perspective than does said live action segment, said method comprising:
    (a) automatically identifying a first plurality of first frames in said series of sequentially ordered frames that presents said replay segment;
    (b) using the previously identified said replay segment, automatically identifying a second plurality of frames in said series of sequentially ordered frames that presents at least a portion of said live action segment; and
    (c) creating a summarization of said video that includes said first and second plurality of frames, respectively, where said summarization includes fewer frames than does said video.

2. The method of claim 1 wherein the last frame of said live action segment is identified by detecting an amount of field color in a frame being less than a threshold, measured in a normalized color space.

3. The method of claim 2 wherein said last frame of said live action segment is identified based on detection of a scene change.

4. The method of claim 1 wherein the first frame of said live action segment is identified using a predetermined interval measured from an identified last frame of said live action segment.

5. A method of processing a video comprising a series of sequentially ordered frames and including soccer and that includes at least one replay segment replaying a live action segment, said method comprising:
    (a) identifying a first plurality of frames in said series of sequentially ordered frames that presents said replay segment;
    (b) using the previously identified said replay segment, automatically identifying a second plurality of frames in said series of sequentially ordered frames that presents at least a portion of said live action segment, wherein the first frame of said live action segment is identified using an automatically selected one of a plurality of predetermined intervals, each respectively measured from an identified last frame of said live action segment; and
    (c) creating a summarization of said video by including said first and second plurality of frames, respectively, where said summarization includes fewer frames than said video.

6. The method of claim 5 wherein said video includes an audio signal and wherein selection of one of said plurality of said predetermined intervals is based on a comparison of the average energy of said audio signal respectively measured over each one of said plurality of intervals.

7. The method of claim 6 wherein said average energy is calculated using a Hamming window.

8. The method of claim 5 wherein said signal includes an audio signal including voice commentary and wherein selection of one of said plurality of predetermined intervals is based on an audio pitch contour of said voice commentary.

9. The method of claim 5 wherein selection of one of said plurality of predetermined intervals is based on the length of said replay segment.

10. The method of claim 5 wherein the smallest of said plurality of predetermined intervals is selected unless a criterion is met.

11. A method of processing a video comprising a series of sequentially ordered frames and including soccer and that includes at least one replay segment replaying a live action segment, said method comprising:
    (a) automatically identifying a first plurality of frames in said series of sequentially ordered frames that presents said replay segment;
    (b) using the previously identified said replay segment, automatically identifying a second plurality of frames in said series of sequentially ordered frames that presents at least a portion of said live action segment;
    (c) automatically identifying a third plurality of frames in said series of sequentially ordered frames that presents an intervening segment of said video between said first plurality of frames and said second plurality of frames, where said third plurality of frames is also used to automatically identify said second plurality of frames;
    (d) creating a summarization of said video by including said first, second, and third plurality of frames, where said summarization includes fewer frames than said video.

12. The method of claim 11 wherein said third segment is a close up of a participant in said soccer.

13. The method of claim 11 wherein said third segment is at least 25% of the combined duration of said first, second, and third segments.

14. The method of claim 11 wherein said third segment is at least 50% of the combined duration of said first, second, and third segments.

15. A method of processing a video comprising a series of sequentially ordered frames and including soccer and that includes at least one replay segment replaying a live action segment, said method comprising:
    (a) automatically identifying a first plurality of frames in said series of sequentially ordered frames that presents said replay segment;
    (b) using the previously identified said replay segment, automatically identifying a second plurality of frames in said series of sequentially ordered frames that presents at least a portion of said live action segment;
    (c) creating a first summary of said video comprising said first plurality of frames and excluding said second plurality of frames;
    (d) creating a second summary of said video comprising said first plurality of frames and said second plurality of frames; and (e) presenting, at the selection of a user, a selected one of said first summary and said second summary.

16. The method of claim 15 wherein the first frame of said live action segment is identified using an automatically selected one of a plurality of predetermined intervals, each respectively measured from an identified last frame of said live action segment.

17. The method of claim 16 wherein said video includes an audio signal and wherein selection of one of said plurality of said predetermined intervals is based on a comparison of the average energy of said audio signal respectively measured over each one of said plurality of intervals.

18. The method of claim 16 wherein said signal includes an audio signal including voice commentary and wherein selection of one of said plurality of predetermined intervals is based on an audio pitch contour of said voice commentary.

19. The method of claim 16 wherein selection of one of said plurality of predetermined intervals is based on the length of said replay segment.

20. A method of processing a video comprising a series of sequentially ordered frames and including soccer and that includes at least one replay segment replaying a live action segment, said method comprising:
   (a) automatically identifying a plurality of frames in said series of sequentially ordered frames that presents said replay segment;
   (b) using the previously identified said replay segment, automatically identifying a second plurality of frames in said series of sequentially ordered frames that presents at least a portion of said live action segment;
   (c) automatically identifying a third plurality of frames in said series of sequentially ordered frames that presents an intervening segment of said video between said first plurality of frames and said second plurality of frames;
   (d) creating a first summary of said video comprising said first plurality of frames and excluding said second and third plurality of frames;
   (e) creating a second summary of said video comprising said first and second plurality of frames and excluding said third plurality of frames;
   (f) creating a third summary of said video comprising said first, second, and third plurality of frames; and
   (g) presenting, at the selection of a user, a selected one of said first summary and said second summary and said third summary.

21. The method of claim 20 wherein the first frame of said live action segment is identified using an automatically selected one of a plurality of predetermined intervals, each respectively measured from an identified last frame of said live action segment.

22. The method of claim 21 wherein said video includes an audio signal and wherein selection of one of said plurality of said predetermined intervals is based on a comparison of the average energy of said audio signal respectively measured over each one of said plurality of intervals.

23. The method of claim 21 wherein said signal includes an audio signal including voice commentary and wherein selection of one of said plurality of predetermined intervals is based on an audio pitch contour of said voice commentary.

24. The method of claim 21 wherein selection of one of said plurality of predetermined intervals is based on the length of said replay segment.

25. The method of claim 20 wherein said intervening segment includes a close-up image of a participant in said soccer.

26. The method of claim 20 wherein said third segment is at least 25% of the combined duration of said first, second, and third segments.

27. The method of claim 20 wherein said third segment is at least 50% of the combined duration of said first, second, and third segments.

28. The method of claim 20 wherein said third segment is at least 75% of the combined duration of said first, second, and third segments.

29. The method of claim 20 wherein the last frame of said live action segment is identified by detecting an amount of field color in a frame being less than a threshold, measured in a normalized color space.

30. The method of claim 29 wherein said last frame of said live action segment is identified based on detection of a scene change.

* * * * *